US010365779B2

(12) United States Patent
McCoy et al.

(10) Patent No.: US 10,365,779 B2
(45) Date of Patent: Jul. 30, 2019

(54) DYNAMICALLY ASSIGNING SHORTCUTS TO MENU ITEMS AND ACTIONS

(75) Inventors: Charles McCoy, Coronado, CA (US); Leo Mark Pedlow, Jr., Ramona, CA (US); True Xiong, San Diego, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 13/474,604

(22) Filed: May 17, 2012

(65) Prior Publication Data

US 2013/0311948 A1 Nov. 21, 2013

(51) Int. Cl.
*G06F 3/048* (2013.01)
*G06F 3/01* (2006.01)

(52) U.S. Cl.
CPC .............. *G06F 3/048* (2013.01); *G06F 3/017* (2013.01)

(58) Field of Classification Search
CPC .... G06F 3/0489; G06F 9/4881; G06F 12/126; G06F 3/048; G06F 3/017
USPC .................................. 715/847, 825
See application file for complete search history.

(56) References Cited

U.S. PATENT DOCUMENTS

| 6,114,978 | A * | 9/2000 | Hoag ..................... G06F 3/0482 341/22 |
| 7,487,000 | B1 | 2/2009 | Chevalier et al. |
| 8,233,888 | B1 * | 7/2012 | Koller ................. H04M 1/6505 455/412.1 |
| 2002/0085042 | A1 | 7/2002 | Matthews, III et al. |
| 2002/0180807 | A1 | 12/2002 | Dubil et al. |
| 2002/0197983 | A1 * | 12/2002 | Chubb .............. H04M 1/72583 455/418 |
| 2007/0013665 | A1 * | 1/2007 | Vetelainen et al. .......... 345/169 |
| 2009/0138910 | A1 | 5/2009 | Jin et al. |
| 2009/0307721 | A1 | 12/2009 | Afram et al. |
| 2010/0050128 | A1 | 2/2010 | Chiang et al. |
| 2010/0205544 | A1 * | 8/2010 | Brzeski et al. ............... 715/758 |
| 2010/0281506 | A1 | 11/2010 | Schmidt et al. |
| 2011/0066983 | A1 * | 3/2011 | Kim .............................. 715/835 |
| 2013/0074014 | A1 * | 3/2013 | Ouyang ................ G06F 3/0488 715/863 |
| 2013/0179814 | A1 * | 7/2013 | Immaneni ............. G06F 3/0481 715/769 |

FOREIGN PATENT DOCUMENTS

WO 2005041020 A1 5/2005

OTHER PUBLICATIONS

First Office Action issued by the Chinese Patent Office dated Dec. 1, 2015 for Chinese Application No. 201310150391.5 in 14 pages.

* cited by examiner

*Primary Examiner* — Jennifer N To
*Assistant Examiner* — Terri L Filosi
(74) *Attorney, Agent, or Firm* — Procopio, Cory, Hargreaves & Savitch LLP

(57) ABSTRACT

Dynamically assigning shortcuts to one or more functions, including: determining the one or more functions to assign shortcuts; dynamically assigning the one or more functions to at least one of buttons, keys, clicks, and touches on a client device as shortcuts; updating a mapping of the shortcuts to the one or more functions; and displaying the assigned shortcuts on a display of the client device. Keywords include shortcuts and menu items.

25 Claims, 2 Drawing Sheets

DYNAMICALLY ASSIGNING SHORTCUTS TO MENU ITEMS AND ACTIONS

BACKGROUND

Field of the Invention

The present invention relates to assigning shortcuts, and more specifically, to dynamically assigning shortcuts to menu items and actions.

Background

In the past several years, multiple additional functions and capabilities have been added to home appliances such as televisions. For example, some newer television models have Internet connection capabilities and include complex menu systems. However, the consumer reaction to the changes in the design of controllers to control and select actions related to these added functions and capabilities have been less than enthusiastic. The design of the newer controller models with a large number of buttons and keys are too complicated for the consumer to learn, while the older models are too simple to cover all of the added capabilities.

SUMMARY

The present invention provides for dynamically assigning shortcuts to one or more functions.

In one implementation, a method of dynamically assigning shortcuts to one or more functions is disclosed. The method includes: determining the one or more functions to assign shortcuts; dynamically assigning the one or more functions to at least one of buttons, keys, clicks, and touches on a client device as shortcuts; updating a mapping of the shortcuts to the one or more functions; and displaying the assigned shortcuts on a display of the client device.

In another implementation, a non-transitory storage medium storing a computer program to dynamically assign shortcuts to one or more functions is disclosed. The computer program includes executable instructions that cause a computer to: determine the one or more functions to assign shortcuts; dynamically assign the one or more functions to at least one of buttons, keys, clicks, and touches on a client device as shortcuts; update a mapping of the shortcuts to the one or more functions; and display the assigned shortcuts on a display of the client device.

Other features and advantages of the present invention will become more readily apparent to those of ordinary skill in the art after reviewing the following detailed description and accompanying drawings.

DETAILED DESCRIPTION

Figure 1:
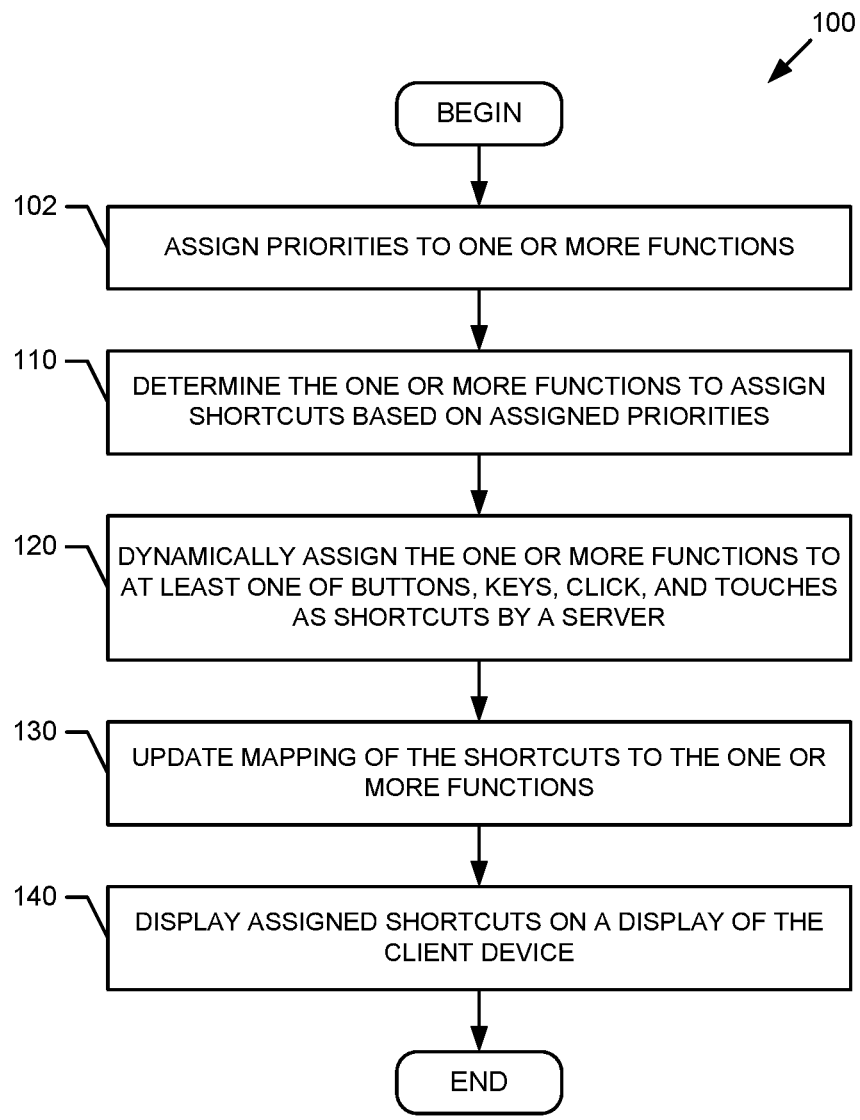
FIG. 1 is a flowchart illustrating a method of dynamically assigning shortcuts to menu items in accordance with one implementation of the present invention.

Certain implementations as disclosed herein describe apparatuses, methods, and systems for dynamically assigning shortcuts to functions such as menu items and actions. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, menu items are dynamically assigned by a server to buttons, keys, clicks, touches, and/or other objects/senses (hereinafter referred to as "buttons, keys, clicks, and/or touches") as shortcuts on a client device including a consumer electronic device such as an IPTV, a disc player, a home theatre system, a phone, a tablet computer, a laptop computer, a desktop computer, a GPS receiver, a game console, etc. In some implementations, other objects/senses include gestures and spoken utterances. Gestures can include movements sensed with a motion sensor or camera, pointer movements and/or clicks, and touches that involve movements and/or multiple touches. Further, peripheral devices such as a remote control or game controller can be used with another client device and the peripheral devices can enable user actions, such as button presses or gestures, that can be assigned to shortcuts.

By dynamically assigning the menu items corresponding to an application, program, or function to buttons, keys, clicks, and/or touches on a client device, the overhead of navigating through the menus can be avoided. Since not all buttons, keys, clicks, and/or touches on a client device are enabled or used while navigating within any particular menu, these temporarily unused buttons, keys, clicks, and/or touches can be assigned to and be used to select the menu items. Further, some remote controls and game controllers include function buttons/keys, usually in different colors or shapes, that are intended to be redefined based on the local context. These buttons or keys can be dynamically assigned to the menu items.

Determining which menu item to assign can depend on the frequency and the popularity (to the user of the client device) of the application, program, function, or action corresponding to the menu items. That is, if the user frequently uses or has expressed an interest in the application, program, or function corresponding to the menu items, the server would mostly likely assign the buttons, keys, clicks, and/or touches to those menu items. Therefore, pressing or touching the buttons, keys, clicks, and/or touches would provide shortcuts to those menu items. Further, as the user moves from one menu to another, the menu items that are available to the user for selection changes, and the assignment of the buttons, keys, clicks, and/or touches to the menu items can be changed.

In one implementation, the client device sends a request to the server and includes shortcuts available in the client device. The request for advertisements or menu customizations includes information about the shortcuts available on the device that the server can assign to the items it includes in the response. In an alternative, the server can initiate a request for the shortcuts available in the client.

In another implementation, non-menu items sometimes need to be assigned. For example, assigning a shortcut for an action such as responding to an advertisement or text description is desirable. In this case, buttons, keys, clicks, and/or touches can be assigned to the action of responding to the advertisement or text description. The shortcut for a particular menu item can be mentioned in an advertisement image shown to the user, thus making it easy for the user to take an action based on the advertisement. An advertisement can direct users to multiple different button, key, click, and/or touch strokes associated with different menu items to give the user a choice on how to respond to the advertisement. Thus, this can be used for things like voting or otherwise giving feedback. There could be multiple advertisements shown at the same time, each directing the user to different buttons, keys, clicks, and/or touches for different menu items. In an alternative, multiple advertisements can direct the user to the same button, key, click, and/or touch, or to different buttons, keys, clicks, and/or touches, all of which are shortcuts for the same menu item. The assignment of a shortcut for an action such as responding to an advertisement of text description can be displayed next to or within the advertisement or text description for the benefit of the user. Examples of an action or function associated with content displayed by the device include showing "displayed" as a choice in a content navigation user interface or being "displayed" by playing audio-only content, such as an Internet radio station. The associated functionality can include voting, marking the content as a favorite, requesting additional information, or opening a user interface to navigate through related content.

In a further implementation, the definition of a shortcut can be extended to a sequence of multiple button, key, click, and/or touch strokes. For example, a menu item can be dynamically assigned to a blue key press followed by a double click on a touch pad. This would allow the number of shortcuts to be greater than the number of buttons, keys, clicks, and/or touches available on a client device. The shortcut definition can be further extended to allow the shortcuts to be set up for menu items that are standard system menus or otherwise not added by the server defining the shortcut to that menu item.

To allow the server defining the menu shortcuts to determine which buttons, keys, clicks, and/or touches are available for use, the server can request the client device to send information on the configuration of its user interface including any buttons, keys, clicks, and/or touches along with information on which buttons, keys, clicks, and/or touches are unused in each context. Further, the server should avoid defining or assigning a button, key, click, or touch that represents a task as a shortcut for an action that performs another task. For example, a fast forward button should not be assigned as a shortcut for an action or menu item that steps through a video clip. However, some buttons, keys, clicks, and/or touches can allow a task to be 'overridden' by defining them as a shortcut for another task. For example, a 'Closed Captioning' key on a client device can be overridden to be a shortcut to a menu item that opens an extended closed captioning control panel that is specific to the current service, rather than triggering the default closed captioning task of the client device.

Once the shortcuts to the menu items and/or actions have been defined dynamically, the assigned shortcuts should be displayed or conveyed to the user on a screen space. Thus, when the user navigates through the menus, the corresponding shortcut buttons, keys, clicks, or touches for the items of menus are also displayed along with the menu items. In additional implementations, the shortcuts can be presented as auditory communication in place of or in addition to the visual communication. In one example, the auditory communication can be used for devices without a visual display. In another example, the auditory communication can be used for devices customized for people with visual impairments.

Although it would be easier to accomplish this visually if each menu item has only one button, key, click, or touch assigned to it as a shortcut, multiple buttons, keys, clicks, or touches can be assigned as a shortcut for a single menu item. These will be pairings with the first item being the button, key, click, or touch and the second item being the label and icons of the menu item corresponding to the button, key, click, or touch. In one example, the shortcuts can be displayed in a particular "help" area on the screen so that the user can easily see what each of the buttons, keys, clicks, or touches are currently assigned to without opening the menus. For example, the shortcuts can be displayed in the "help" area within a bar across the bottom of the screen.

In another implementation, determining which shortcuts to apply to menu items is determined by a client device which has the most information about the client device and its user interface. Moreover, there is a wide variety of client devices with varying interface capabilities. For example, some televisions have buttons (e.g., colored function buttons) on the remote control that other televisions do not have. The differences get even larger when comparing different product types, such as Blu-ray players and televisions. Some client devices may have input methods other than the remote control, such as a full keyboard, that can be used to trigger shortcuts. In another example, a new function is sent down from a satellite to a variety of car GPS systems that may then allow the user to select the new function. The user interfaces of the GPS systems may widely vary, even though they are all using the same satellite data feed. This means that the data feed specifying the new function cannot specify how the function is triggered and so the method of triggering is left up to the client device. The data feed can specify what text to label that action with such that the user will know what action will be triggered.

In yet another implementation, each menu item has a flag (e.g., a boolean state) indicating whether a shortcut is desirable for that item or not. This flag can be turned on and off dynamically for menu items as they become more or less relevant to the current context. The menu items can be hidden dynamically, thus preventing the items from being selected by the user. When a shortcut is removed from a menu item, that shortcut can then be reused for other items that need a shortcut.

In another implementation, shortcuts are dynamically reassigned as the local context changes. For example, the blue button can have one action in an account management screen, but the blue button could be reassigned to another action in a content navigation screen since the previously-assigned account management function is not available in the content navigation screen. The client device remembers the mappings it used so that it can reassign them consistently. Therefore when the user navigates back to the account management screen later, the blue button will again be assigned to the same account management function that it was assigned to previously.

The assignment of the shortcuts to the menu items can be rearranged when the request for a shortcut is added back to the original item. This would ensure consistency for the shortcut to the original item, but it would mean less consistency for the shortcut to the item that the shortcut was reused for. If a menu item with a shortcut is hidden but the shortcut was not removed from the item, that shortcut should not be reused for another item even though it currently will not trigger a menu item. This will preserve consistency of shortcut actions for the user when the item is visible again.

In another implementation, the device receives advertisements from the server and dynamically assigns shortcuts to functions associated with the advertisements. Although the functions may be independent of menu items, the device can make the user selectable functions associated with advertisements available for the user to select when the corresponding advertisement is playing. The device can have a standard menu for items that are relative to the current content that is playing where it places these items. Further, in other implementations, the user selectable functions can be defined for non-advertising content.

On receiving menu items from a server, the client device determines the shortcuts available on the device that can be assigned to the menu items. After the shortcuts have been determined, the client device assigns such shortcuts to the menu items. The client device may also communicate to a user what actions would result when the user selects the shortcuts. Further, the client device associates the label/wording for the shortcut and displays the label/wording to the user. In some cases, there can be more than one label requested. The labels can be associated with parts of the data, such as an advertisement, in which case the labels will be displayed by the client device that is grouped with that part of the data. In the example of a label for an item associated with an advertisement, it may request to label the shortcut for item "678" with the text "for more information". In that case, the client device may display the label "Press the green function button on your remote control for more information" when the green function button is assigned as a shortcut, and may display "Choose the 'More Information' menu item from the options menu for more information" when there are no more shortcuts available to assign one to option "678". The data may specify another advertisement that has a different item labeled with "for more information" display grouped with it.

The mapping of the shortcuts to the menu items is dynamically updated in order to determine if the shortcuts are available on the client device and can be assigned to the newly-received menu items, or to actions requiring shortcuts. Dynamically updating the shortcut mapping determines if any of the assigned shortcuts can be released for re-use when the previously-assigned menu items no longer exist.

FIG. 1 is a flowchart 100 illustrating a method of dynamically assigning shortcuts to functions in accordance with one implementation of the present invention. A function can be a menu item, a functionality associated with an advertisement or other content, or any type of action that can be triggered by a user interface interaction by the user. Examples of actions that can be triggered by a user interface interaction include launching an application, changing the device behavior, or changing a setting or value. In the illustrated implementation of FIG. 1, priorities are assigned to one or more functions, at box 102. Further, a determination on which of the one or more functions should be assigned to shortcuts is made based on the assigned priorities, at box 110. That determination usually depends on the frequency and the popularity (e.g., to the user of the client device) of the application, program, function, or action corresponding to the menu items. That is, if the user frequently uses or has expressed an interest in the application, program, or function corresponding to the menu items, the server would mostly likely assign the buttons, keys, clicks, and/or touches to those menu items. In an alternative, a user interface designer or server can assign a priority to the request for a shortcut for a function. That is, a function that is important to be able to select quickly is given a higher priority and is more likely to be assigned a shortcut to allow a user to trigger it easily. Similarly, a preferred shortcut, such as the blue key, can be specified to assign to a function. When assigning shortcuts, the functions are mapped to their preferred shortcut when available.

Once the determination on which of the one or more functions to assign has been made, the one or more functions are dynamically assigned, at box 120, to at least one of buttons, keys, clicks, and touches on a client device including a consumer electronic device such as an IPTV, a disc player, a home theatre system, a phone, a tablet computer, a laptop computer, a desktop computer, a GPS receiver, a game console, etc. Further, peripheral devices such as a remote control or game controller can be used with another client device and the peripheral devices can enable user actions, such as button presses or gestures, that can be assigned to shortcuts. In one case, the assignment of menu items to shortcuts is made by a server. In another case, the assignment of menu items to shortcuts is made by a client device. By dynamically assigning the menu items corresponding to an application, program, or function to buttons, keys, clicks, and/or touches on a client device, the overhead of navigating through the menus can be avoided. Since not all buttons, keys, clicks, and/or touches on a client device are enabled or used while navigating within any particular menu, these temporarily unused buttons, keys, clicks, and/or touches can be assigned to and be used to select the menu items. Some remote controls and game controllers include function buttons/keys, usually in different colors or shapes, that are intended to be redefined based on the local context. These buttons or keys can be dynamically assigned to the menu items. Further, as the user moves from one menu to another, the menu items that are available to the user for selection changes, and the assignment of the buttons, keys, clicks, and/or touches to the menu items can be changed. Similarly, as a user moves from one state or screen to another, the functionality that is available in that context changes and the device can reassign the shortcuts. Once the menu items are dynamically assigned, the shortcut assignments should be remembered so that the shortcuts can be consistently reassigned when the user navigates back to the same context.

Once the shortcuts to one or more functions have been assigned dynamically, the mapping of the shortcuts to the one or more functions is updated, at box 130. Further, the assigned shortcuts are displayed or conveyed to the client device on a screen space, at box 140. Thus, when the user navigates through the menus, the corresponding shortcut buttons, keys, clicks, or touches for the items of menus are also displayed along with the menu items. Although it would be easier to accomplish this visually if each menu item has only one button, key, click, or touch assigned to it as a shortcut, multiple buttons, keys, clicks, or touches can be assigned as a shortcut for a single menu item.

The mapping of the shortcuts to the one or more functions is dynamically updated, at box 130, in order to determine if the shortcuts are available on the client device and can be assigned to the newly-received menu items, or to actions requiring shortcuts. Dynamically updating the shortcut mapping determines if any of the assigned shortcuts can be released for re-use when the previously-assigned menu items no longer exist. In a further implementation, the shortcuts are reassigned based on a change in the functionality available in the current context.

Figure 2A:
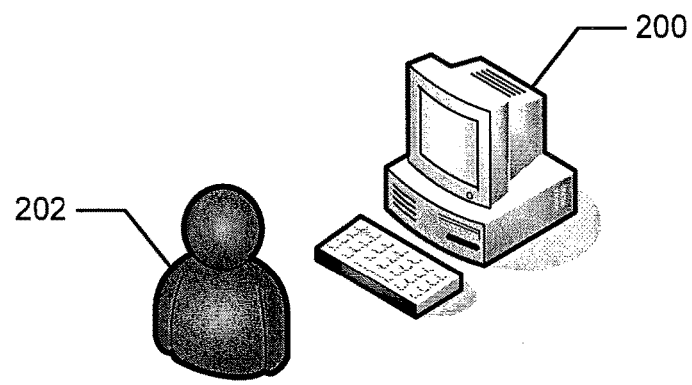
FIG. 2A illustrates a representation of a computer system and a user.

FIG. 2A illustrates a representation of a computer system 200 and a user 202. In one implementation, the computer system 200 can be configured as a server to provide shortcut assignment for a client device. In another implementation, the computer system 200 can be configured as a consumer electronic device such as an IPTV, a disc player, a home theatre system, a phone, a tablet computer, a laptop computer, a desktop computer, a GPS receiver, a game console, etc. to provide shortcut assignments.

Figure 2B:
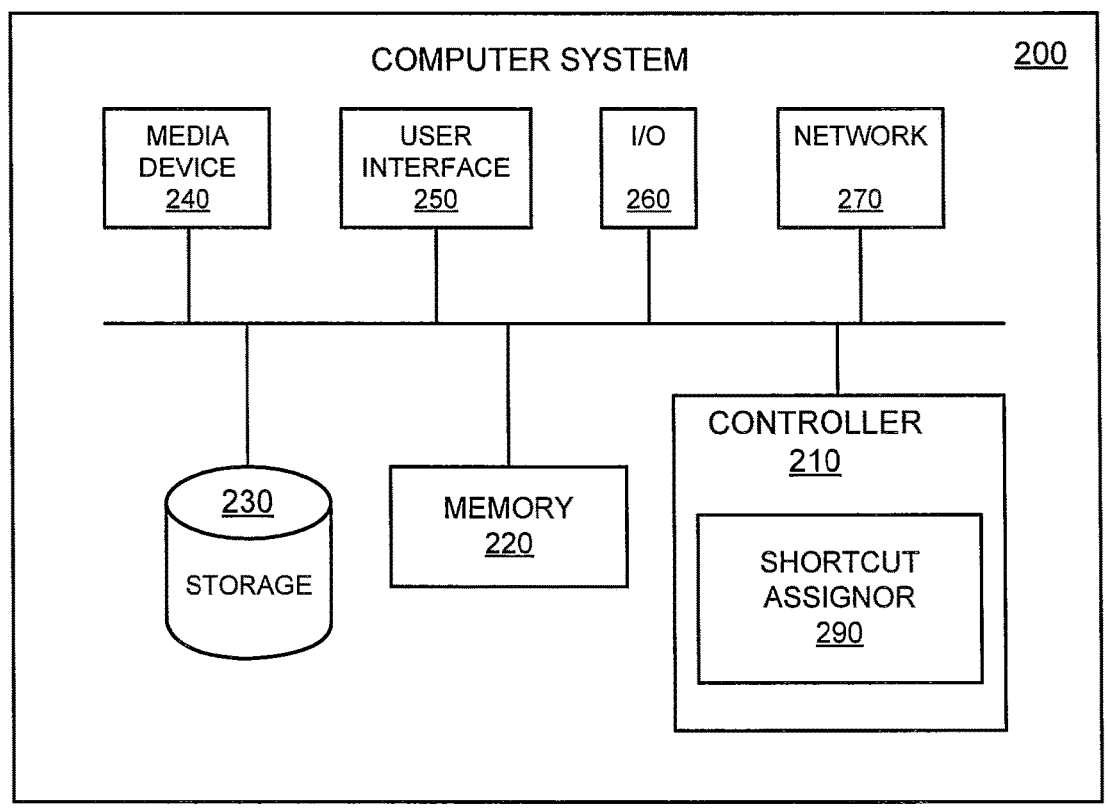
FIG. 2B is a functional block diagram illustrating the computer system hosting a shortcut assignor.

FIG. 2B is a functional block diagram illustrating the computer system 200 hosting a shortcut assignor 290. The controller 210 is a programmable processor and controls the operation of the computer system 200 and its components. The controller 210 loads instructions (e.g., in the form of a computer program) from the memory 220 or an embedded controller memory (not shown) and executes these instructions to control the system. In its execution, the controller 210 provides the shortcut assignor 290 as a software system. Alternatively, this service can be implemented as separate hardware components in the controller 210 or the computer system 200.

Memory 220 stores data temporarily for use by the other components of the computer system 200. In one implementation, memory 220 is implemented as RAM. In one implementation, memory 220 also includes long-term or permanent memory, such as flash memory and/or ROM.

Non-transitory storage 230 stores data for use by other components of the computer system 200, such as for storing data used by the shortcut assignor 290. In one implementation, storage 230 is a hard disk drive.

The media device 240 receives removable media and reads and/or writes data to the inserted media. In one implementation, for example, the media device 240 is an optical disc drive.

The user interface 250 includes components for accepting user input from the user 202 and presenting information to the user 202. In one implementation, the user interface 250 includes a keyboard, a mouse, audio speakers, and a display. The controller 210 uses input from the user 202 to adjust the operation of the computer system 200.

The I/O interface 260 includes one or more I/O ports to connect to corresponding I/O devices, such as external storage or supplemental devices (e.g., a printer or a PDA). In one implementation, the ports of the I/O interface 260 include ports such as: USB ports, PCMCIA ports, serial ports, and/or parallel ports. In another implementation, the I/O interface 260 includes a wireless interface for communication with external devices wirelessly.

The network interface 270 includes a wired and/or wireless network connection, such as an RJ-45 or "Wi-Fi" interface (including, but not limited to 202.11) supporting an Ethernet connection. In some implementations, a network interface may not be present. For example, a car GPS system that receives its data from a satellite antenna would not have a network connection but would still be a computer system 200 that dynamically assigns shortcuts.

The computer system 200 includes additional hardware and software typical of computer systems (e.g., power, cooling, operating system), though these components are not specifically shown in FIG. 2B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the specification focuses on dynamically assigning shortcuts to menu items or actions, shortcuts can be assigned for other matters such as operating applications or games. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of dynamically assigning shortcuts to one or more functions of a client device, the method comprising:
   assigning priorities to the one or more functions;
   determining the one or more functions to assign shortcuts, wherein the one or more functions to assign the shortcuts are determined based on the assigned priorities;
   dynamically assigning a first function of the one or more functions to a first user input including at least one of buttons, keys, clicks, and touches as a first shortcut, based on the priorities,
   wherein the dynamic assignment of the one or more functions to at least one of buttons, keys, clicks, and touches as shortcuts is performed by a server in communication with the client device;
   determining whether any assigned shortcuts can be released for reuse as a second shortcut for a different function of the one or more functions;
   displaying the assigned shortcuts on a display of the client device; and
   dynamically assigning a second function of the one or more functions to the first shortcut based on the priorities and a user interaction with the client device.

2. The method of claim 1, wherein the first user input comprises the at least one of buttons, keys, clicks, and touches performed at a remote device communicatively coupled to the client device.

3. The method of claim 1, wherein the touches include gestures and button presses.

4. The method of claim 3, wherein the gestures include at least one of: movements sensed with a motion sensor or camera; pointer movements or clicks; and touches that involve movements.

5. The method of claim 1, wherein assigning priorities includes assigning higher priorities to the one or more functions that are more important to be able to select quickly.

6. The method of claim 1, wherein determining the one or more functions to assign shortcuts is based also on a shortcut of a function.

7. The method of claim 1, wherein determining the one or more functions to assign shortcuts comprises
   determining frequency and popularity of at least one of an application, program, function, and action corresponding to each function of the one or more functions to a user of the client device.

8. The method of claim 7, further comprising
   assigning the each function to a button, key, click, or touch as a shortcut when it is determined that the user frequently uses or has expressed an interest in the application, program, or function corresponding to the each function.

9. The method of claim 1, wherein the client device includes a consumer electronic device including one of an IPTV, a disc player, a home theatre system, a phone, a tablet computer, a laptop computer, a desktop computer, a GPS receiver, and a game console.

10. The method of claim 1, wherein the first user input comprises the at least one of buttons, keys, clicks, and touches performed at the client device.

11. The method of claim 1, wherein displaying the assigned shortcuts comprises
displaying the assigned one or more functions along with corresponding shortcut buttons, keys, clicks, or touches.

12. The method of claim 1, further comprising
receiving one or more advertisements with one or more associated functions from a server in communication with the client device.

13. The method of claim 12, wherein dynamically assigning the one or more functions comprises
dynamically assigning the shortcuts to the one or more functions associated with the one or more advertisements.

14. The method of claim 1, wherein the one or more functions includes actions.

15. The method of claim 14, wherein the actions comprise responding to at least one of an advertisement and text description.

16. The method of claim 15, further comprising
displaying the shortcuts for responding to the at least one of an advertisement and text description in an image of the advertisement or text description.

17. The method of claim 1, wherein dynamically assigning the one or more functions comprises
assigning the one or more functions to a sequence of multiple button, key, click, and touch strokes.

18. The method of claim 1, further comprising
requesting the client device to send information on the shortcuts that are available.

19. The method of claim 18, further comprising
receiving the information on the shortcuts that are available from the client device.

20. The method of claim 19, further comprising
using the received information on the shortcuts to assign available shortcuts to the one or more functions indicated in a response.

21. The method of claim 1, wherein the one or more functions includes a function associated with content displayed by the client device.

22. A non-transitory storage medium storing a computer program to dynamically assign shortcuts to one or more functions of a client device, the computer program comprising executable instructions that cause a computer to:
assign priorities to the one or more functions;
determine the one or more functions to assign shortcuts, wherein the one or more functions to assign shortcuts are determined based on the assigned priorities;
dynamically assign a first function of the one or more functions to a first user input including at least one of buttons, keys, clicks, and touches as a first shortcut, based on the priorities,
wherein the dynamic assignment of the one or more functions to at least one of buttons, keys, clicks, and touches as shortcuts is performed by a server in communication with the client device;
determining whether any assigned shortcuts can be released for reuse as a second shortcut for a different function of the one or more functions;
display the assigned shortcuts on a display of the client device; and
dynamically assign a second function of the one or more functions to the first user input based on the priorities and a user interaction with the client device.

23. The non-transitory storage medium of claim 22, wherein the first user input comprises the at least one of buttons, keys, clicks, and touches performed at one of the client device and a remote device communicatively coupled to the client device.

24. A method for dynamically assigning shortcuts to one or more functions of a client device communicatively coupled to a server, the method comprising:
assigning priorities to one or more functions based on user interactions at the client device;
storing, in a memory, indications of available shortcuts at the client device, each shortcut including one or more interface interactions with the client device;
assigning a first function of the one or more functions to a first shortcut based on the priorities and a first local context at the client device, the local context comprising a state of media or an application in use at the client device;
determining whether any assigned shortcuts can be released for reuse as a second shortcut for a different function of the one or more functions;
assigning a second function of the one or more functions to the first shortcut based on the priorities and a second local context at the client device, different from the first local context;
reassigning the first shortcut to the first function when the client device navigates back to the first local context; and
displaying assigned shortcuts via the client device.

25. The method of claim 24, wherein the interface interactions comprise a user input received at one of the client device and a remote device separate from and communicatively coupled to the client device.

* * * * *